No. 880,632. PATENTED MAR. 3, 1908.
A. L. CREELMAN.
CASH REGISTER REVOLVING INDICATING TARGET.
APPLICATION FILED JULY 11, 1906.

Witnesses. Inventor.
Alvah Lewis Creelman

No. 880,632. PATENTED MAR. 3, 1908.
A. L. CREELMAN.
CASH REGISTER REVOLVING INDICATING TARGET.
APPLICATION FILED JULY 11, 1906.
11 SHEETS—SHEET 2.

Fig. 2.

Witnesses.
Inventor,
Alvah Lewis Creelman

No. 880,632. PATENTED MAR. 3, 1908.
A. L. CREELMAN.
CASH REGISTER REVOLVING INDICATING TARGET.
APPLICATION FILED JULY 11, 1906.
11 SHEETS—SHEET 3.

Fig. 3.

Witnesses
Inventor
Alvah Lewis Creelman

No. 880,632. PATENTED MAR. 3, 1908.
A. L. CREELMAN.
CASH REGISTER REVOLVING INDICATING TARGET.
APPLICATION FILED JULY 11, 1906.
11 SHEETS—SHEET 5.

Witnesses
Carl Schafer
W. E. Marsh.

Inventor
Alvah Lewis Creelman

No. 880,632. PATENTED MAR. 3, 1908.
A. L. CREELMAN.
CASH REGISTER REVOLVING INDICATING TARGET.
APPLICATION FILED JULY 11, 1906.
11 SHEETS—SHEET 9.

Fig. 13.

Witnesses
Inventor
Alvah Lewis Creelman

UNITED STATES PATENT OFFICE.

ALVAH LEWIS CREELMAN, OF CHICAGO, ILLINOIS.

CASH-REGISTER REVOLVING INDICATING-TARGET.

No. 880,632.   Specification of Letters Patent.   Patented March 3, 1908.

Application filed July 11, 1906. Serial No. 325,743.

*To all whom it may concern:*

Be it known that I, ALVAH LEWIS CREELMAN, a citizen of the United States, residing at Chicago, in the county of Cook and State of Illinois, have invented certain new and useful Improvements in Cash-Register Revolving Indicating-Targets, of which the following is a specification, reference being had to the accompanying drawings, forming part of this specification.

My invention relates to that class of cash registers and indicators where revolving targets are employed. In the present target indicators it would be quite inconvenient, very cumbersome and intricate to supply a separate target for each unit, each ten, each hundred and each thousand from one cent to $99.99 with the separate amounts that could be manipulated with the transposition of these four figures.

By the use of my revolving targets any amount from one cent to $99.99 may be readily indicated and shown upon the targets which read alike on both the front and rear of the machine.

Similar letters refer to similar parts.

Figure 1:
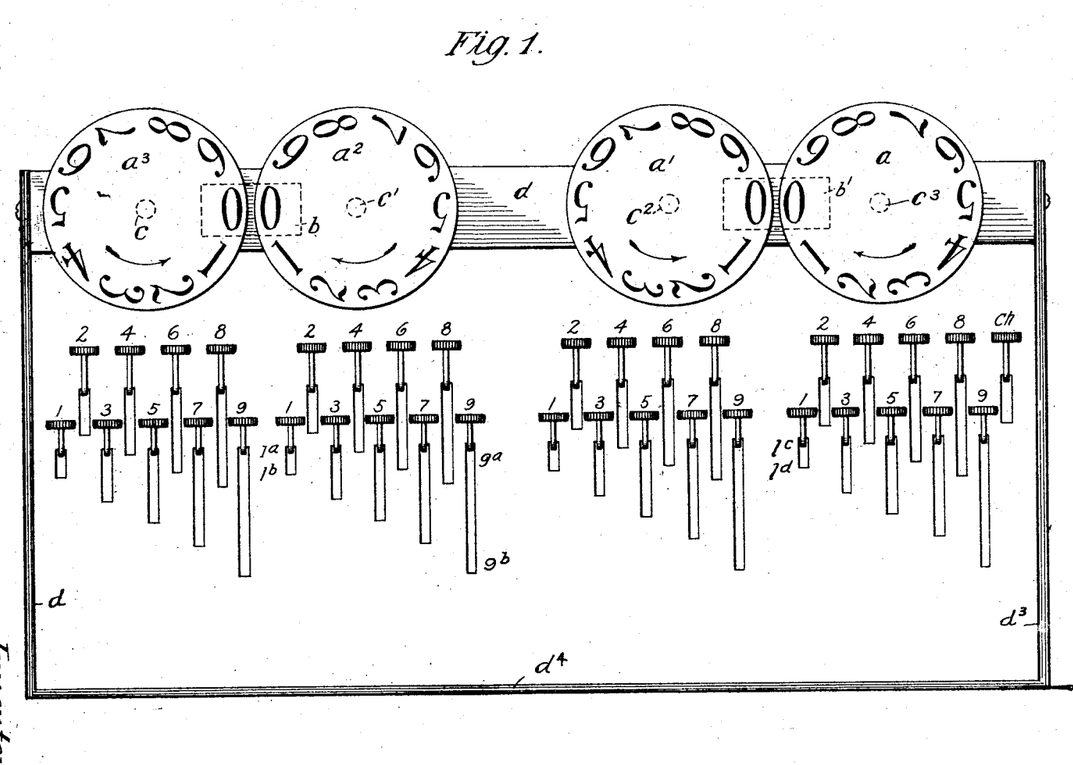
Figure 1 is a face view of the revolving targets and the keys with the casing removed.

In Fig. 1, reading from left to right the first nine keys on the right hand control the unit target, the second nine keys control the tens target, the third nine keys control the hundreds target and the fourth nine keys control the thousands target. The normal position of the targets are as shown at zero, no key being necessary for the ciphers. An opening in the outer case is represented by the lines $b$, $b^1$, Fig. 1, to enable the targets to be read through the casing. The two targets $a$, $a^1$, on the right represent the cents and the two targets $a^2$, $a^3$ on the left represent the dollars. The direction of the targets is as indicated by the arrows but their reversal is herein contemplated.

In the drawings $d$, $d^1$, $d^2$, $d^3$, represent the top of the frame, and $d^4$, the base of the machine. Uprights $d^1$, $d^2$, are attached to frame $d$, and to base $d^4$. Extending from frame $d$, to frame $d^1$, is a shaft $c^5$. There is also a shaft $c^4$ extending from frame $d^2$, to $d^3$. Upon these two shafts are loosely placed the four sets of keys 1—9. A shaft $c^{10}$, extends from frame $d^1$, to frame $d^2$. Shafts $c^4$, $c^5$, $c^{10}$ are rigidly attached to framework $d$, $d^1$, $d^2$, $d^3$. Upon shaft $c^{10}$ there are gear wheels $p$, $p^1$, $p^2$, $p^3$, riding loosely upon the shaft $c^{10}$, and meshing with the registering device but of an improved form, which is fully illustrated in Figs. 15, 16, 17.

Figure 5:
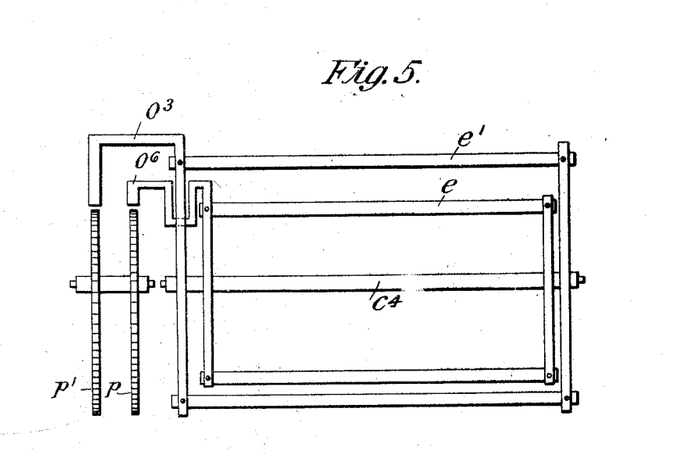
Fig. 5 is a plan view of two of the rockers with their corresponding gear wheels, other parts of the mechanism being omitted.
Figure 6:
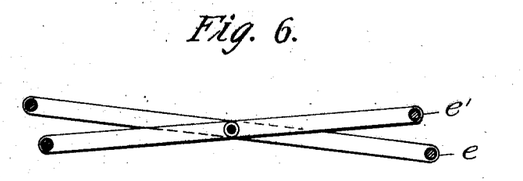
Fig. 6 is a sectional view of the rockers out of normal.
Figure 7:
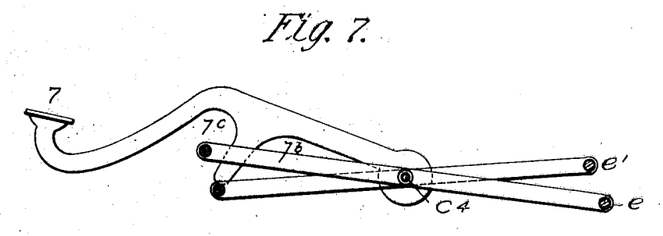
Fig. 7 shows the operation of the keys upon the unit rocker.
Figure 8:
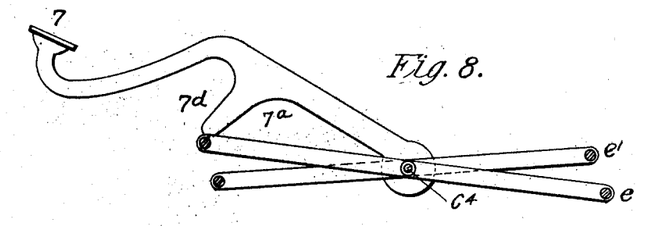
Fig. 8 shows the operation of the keys upon the tens rocker.

The rockers $e$, $e^1$, shown in Figs. 5, and 6, work loosely upon shaft $c^4$, between frames $d^2$, $d^3$ and are operated by the keys as shown in Figs. 7, 8. When in their normal position these rockers $e$, $e^1$ are parallel the keys being curved as at $7^a$, $7^b$, Figs. 7, 8, in such a manner that when the key 7 of the unit rocker $e$ is depressed tappet $7^d$ will not interfere with rocker $e^1$ which controls the tens target $a^1$. Likewise when key 7 of the tens target $a^1$ is operated upon tappet $7^c$ will not interfere with rocker $e$ of the units target $a$. Tappets $7^c$, $7^d$, operate upon the outer bars of rockers $e$, $e^1$, between shaft $c^4$, and the key button 7.

Figure 3:
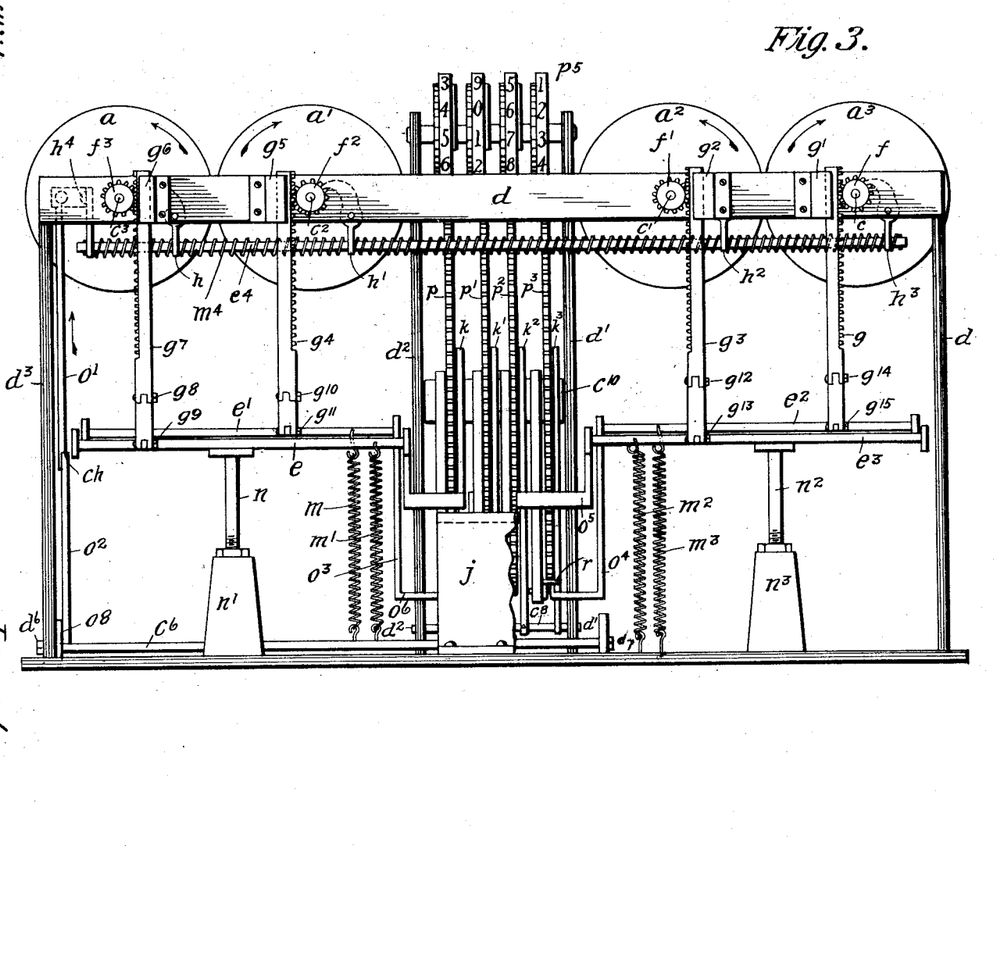
Fig. 3 is a back view with the rear targets removed showing the operation of the racks upon the front targets.
Figure 9:
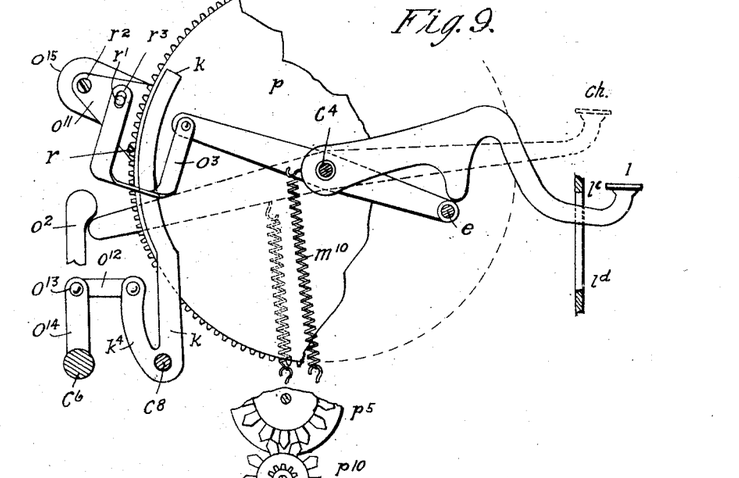
Fig. 9 shows the mechanism to prevent overthrowing. It also shows the change key for releasing the targets so that they may return to zero.

To the back end of rocker $e$, Fig. 3, is attached a rack $g^7$, loosely pivoted at $g^9$ and provided with a knuckle jointed link at $g^8$. Upon the depression of key 1 operating rocker $e$, fulcrumed at $c^4$, this rack, $g^7$, is raised and as it is in mesh with gear wheel $f^3$ which is rigidly attached to shaft $c^3$ of target $a$, and sliding in guide $g^6$, target, $a$, will be revolved. The slot $1^c$, $1^d$, is an opening in the outer casing admitting of the depression of the key levers. The slots are of different lengths to permit differential movement of the indicator and register wheels. On the inner end of rocker $e$ is rigidly attached an arm $O^3$, more fully shown in Figs. 9, 10. Attached to shaft $c^{10}$ of the registering device and riding loosely thereon is an arm, $o^{15}$, Fig. 10, the reverse side of which is shown in Fig. 9. Arm $O^{15}$ carries a second arm, $o^{11}$, loosely pivoted to arm $O^{15}$ at $r^2$. Rigidly attached to arm $o^{11}$, is a pin $r$, capable of engaging with the gear teeth of gear wheel $p$ when key 1 is depressed. In the outer end of arm $o^3$, is an elliptical opening, $r^3$, encircling a pin, $r^1$. Pin $r^1$ is rigidly attached to arm $o^{11}$, and when key 1 is depressed the outer end of rocker $e$, fulcrumed at $c^4$, will be raised, carrying $o^3$ upward and the lower end of elliptical opening $r^3$ will engage pin $r^1$ raising arm $o^{11}$, and pin $r$ will be thrown upward and engage the teeth of gear wheel $p$. Arm $o^{11}$, being loosely pivoted at $r^2$ on arm $o^{15}$, when an upward pressure is brought upon arm $o^3$ by the depression of key 1, two opposing circles will be formed above the horizontal center of wheel $p$ and pin $r$, will become locked in the gear teeth of wheel $p$ and will prevent wheel $p$ from being overthrown.

Figure 10:
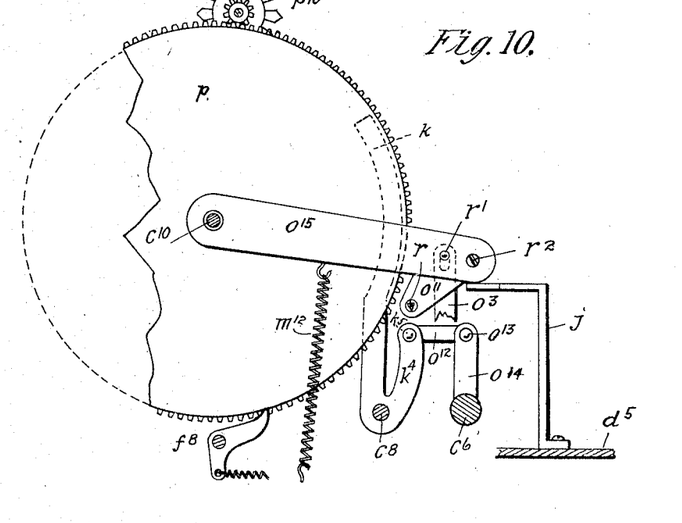
Fig. 10 is the reverse side of Fig. 9.

Detent pawl $f^8$, Fig. 10, will prevent the turning backward of gear wheel $p$ and arm $e$ will remain stationary while locked by pin $r$ to gear wheel $p$ regardless of the distance key 1 has been depressed until pin $r$ has been extricated from the gear teeth of wheel $p$, by release arm $k$. Retraction spring $m^{10}$, Fig. 9, will exert itself as soon as the manual pressure upon key 1 has been removed and spring $m^{10}$ will return key 1 upward to its normal position but rocker $e$ will remain as placed by the depression of key 1 until change key $ch$ has operated upon arm $o^2$ of shaft $c^6$ releasing pin $r$, from the gear teeth of wheel $p$ by pressing lever $k$ against pin $r$, Fig. 9 forcing pin $r$, out of the gear teeth of wheel $p$ and allowing spring $m^1$, Fig. 3 to exert itself and return rocker $e$ to its normal position resting upon screw $n$, Fig. 3.

Figure 2:
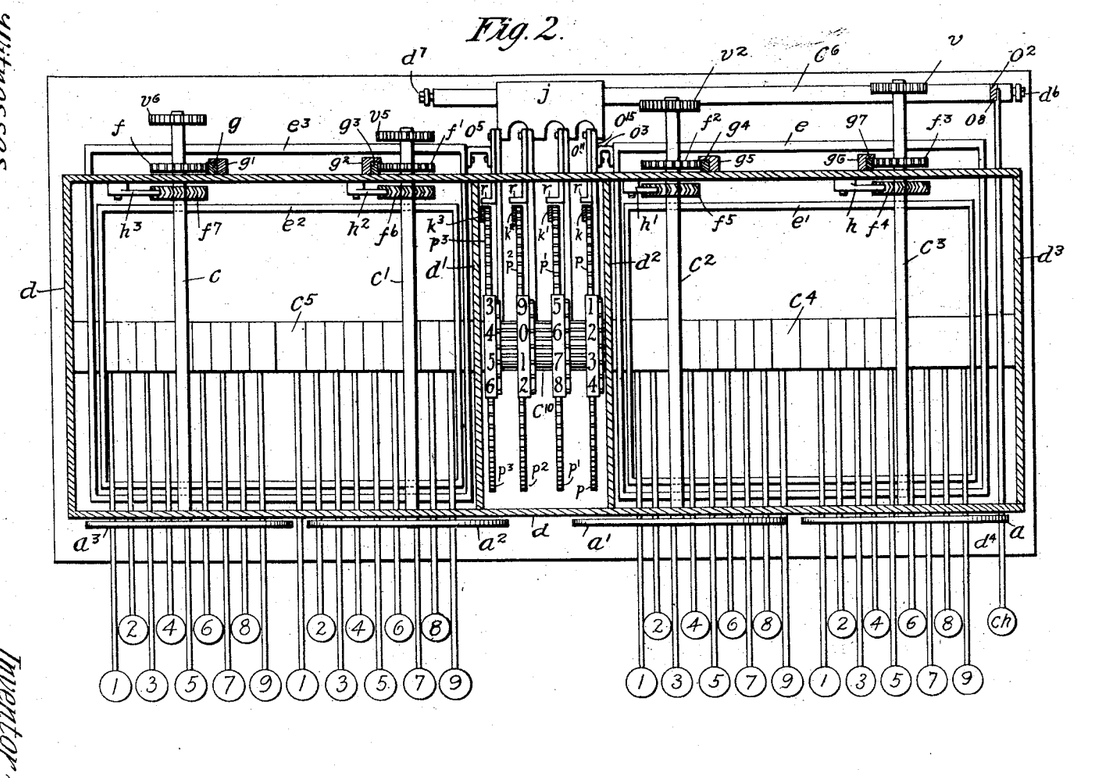
Fig. 2 is a top view with the rear targets removed.
Figure 4:
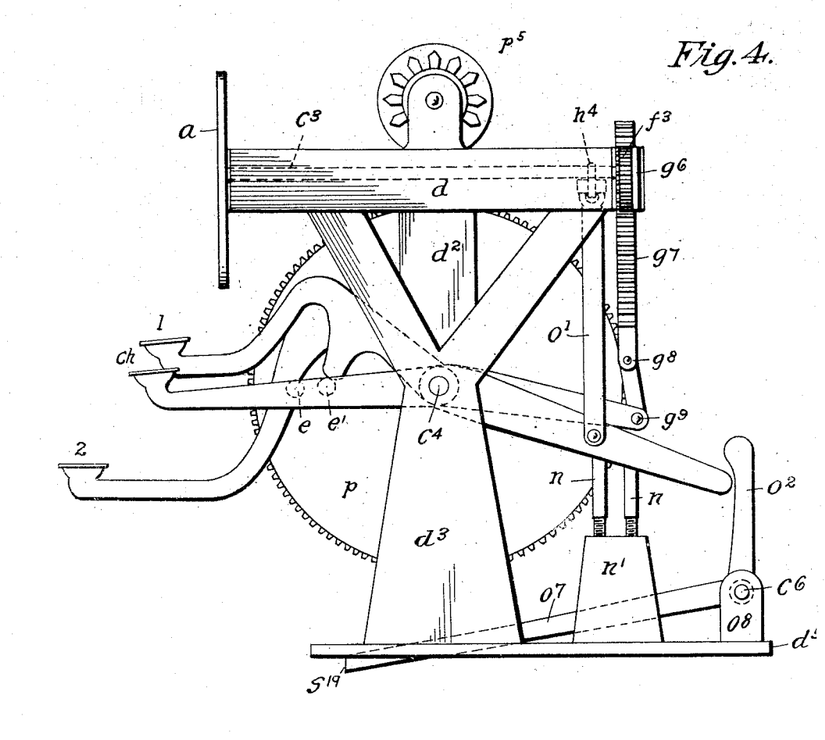
Fig. 4 is an end elevation of the machine.

A rest $j$, Figs. 2, 3, 10, is rigidly attached to base $d^5$, the upper end of rest $j$ forming a support for an arm $o^{15}$ but allowing arm $o^{11}$ to pass rest $j$, Fig. 2, and draw pin $r$, on arm $o^{11}$ downward to its normal position clearing the teeth of gear wheel $p$ under the influence of spring $m^1$, Fig. 3, attached to rocker $e$, as soon as change key $ch$, Figs. 4, 9, has been operated upon moving lever $k$, in an outward direction disengaging pin $r$ from the gear teeth of wheel $p$ as arm $c^3$, is carried downward. It is to be understood that arms $o^3$, $o^4$, $o^5$, $o^6$, Fig. 3, each operate upon a separate gear wheel of the registering device but that only one arm has been carried through this specification for the purpose of illustration. Both the right and left sides of the machine being identical except the monetary valuation produced by the targets and registering device.

Figure 11:
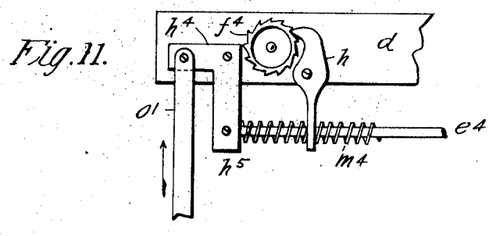
Fig. 11 is a detailed drawing representing the mechanism for releasing the targets and it is the reverse side of frame $d$, shown in Fig. 3.
Figure 18:
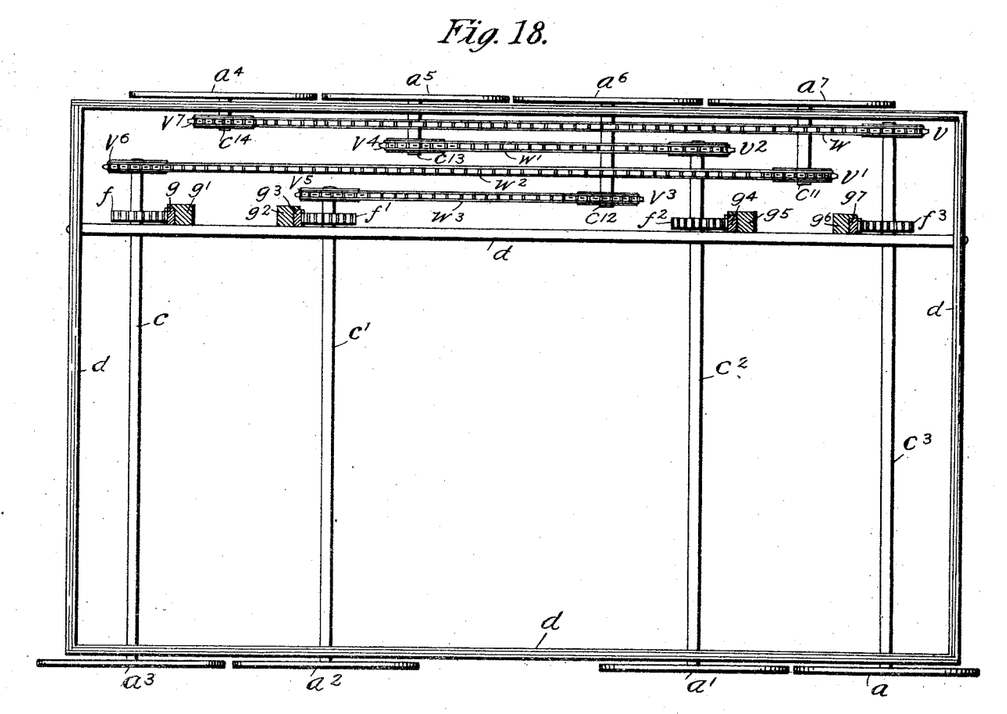
Fig. 18 is a top view of the mechanism for operating the rear targets.

It is necessary to open a cash drawer before a deposit can be made therein and a previous deposit should not remain shown upon the targets. A change key $ch$, Figs. 2, 3, 4, is provided for resetting the targets $a$, $a^1$, $a^2$, $a^3$, $a^4$, $a^5$, $a^6$, $a^7$, back to zero upon the depression thereof. In Fig. 3, is shown a shaft $c^6$, loosely pivoted to the framework at $d^6$, $d^7$, and carrying an arm, $o^2$, better shown in Figs. 4, 9. Change key, $ch$, engages with an arm $o^2$, which is rigidly attached to shaft $c^6$ and as change key $ch$, is depressed the forward end comes in contact with arm. $o^2$, turning shaft $c^6$, in an outward direction. Behind rest $j$, Fig. 3, is another arm, $o^{14}$, rigidly attached to shaft $c^6$, Fig. 10. Loosely pivoted to arm $o^{14}$ at $o^{13}$, Fig. 10, a link $o^{12}$, is loosely pivoted at $k^5$ to elbow $k^4$ of release arm $k$. Release arm $k$ is rigidly attached to shaft $c^8$ and shaft $c^8$ is loosely pivoted to frame $d^1$, $d^2$, under the gear wheels $p$, $p^3$. Release arm $k$ extends upward following the curvature of gear wheel $p$, sufficiently far to release pin $r$, arm $o^{11}$, from the gear teeth of wheel $p$, when the change key $ch$, has been depressed, turning shaft $c^6$ in an outward direction. There are four release arms, $k$, $k^1$, $k^2$, $k^3$, Fig. 3, and they are all rigidly attached to shaft $c^8$ and connected to shaft $c^6$ as shown in Figs. 9, 10. Upon the depression of change key $ch$, these four release arms disengage the pins $r$, from the teeth of the four gear wheels $p$, $p^1$, $p^2$, $p^3$, and springs $m$, $m^1$, $m^2$, $m^3$, exert themselves, drawing rockers $e$, $e^1$, $e^2$, $e^3$, downward where they rest upon the regulating screws, $n$, $n^2$, Figs. 3, 4, which are placed in standards $n^1$, $n^3$, attached to framework base $d^5$. When rockers $e$, $e^1$, $e^2$, $e^3$, are released and allowed to return to their normal position upon screws $n$, $n^2$, racks $g$, $g^3$, $g^4$, $g^7$, Fig. 3, also descend and return targets $a$, $a^1$, $a^2$, $a^3$, $a^4$, $a^5$, $a^6$, $a^7$, back to zero, as shown in Figs. 1, 18. In order that the targets may be allowed to return to zero, an arm $o^1$, Figs. 3, 4, 11, is loosely attached to change key $ch$, near its outer end. This arm $o^1$, has its upper end loosely attached to an L-arm $h^5$ which is also loosely pivoted at $h^4$ to frame $d$, Fig. 11. To the lower end of this second, or L-arm, $h^5$ is loosely attached a sliding rod $e^4$, Fig. 3. Rod $e^4$ is encircled by an extension spring, $m^4$, which keeps pawls $h$, $h^1$, $h^2$, $h^3$, in contact with ratchet wheels $f^4$, $f^5$, $f^6$, $f^7$, Fig. 2 until released by a downward pressure on change key $ch$.

In Fig. 18 is shown a top view of the rear targets $a^4$, $a^5$, $a^6$, $a^7$. The bottom of the drawing is the front of the machine and the top of the drawing is the back of the machine. The target $a$, on the right of the machine is the unit target as shown in Fig. 1. It is obvious that if say 9 cents should be indicated on this unit target $a$, and a similar target should be placed upon the other end of shaft $c^3$, that it would read $90.00 when looked at from the back of the machine. To overcome this feature and that the targets may read correctly from a back view of the machine I transpose the readings on target $a$, to target $a^4$, from target $a^1$, to target $a^5$, from target $a^2$, to target $a^6$, and from target $a^3$, to target $a^7$, by employing sprocket wheels and a sprocket or endless link chain. Rigidly attached to shaft $c^3$, is a sprocket wheel $v$, over which runs a link chain $w$. This chain $w$, passes over sprocket wheel $v^7$ of target $a^4$. Both the sprocket wheel $v^7$ and target $a^4$ are rigidly attached to shaft $c^{14}$ which passes loosely through the back frame work $d$. To shaft $c^2$ is rigidly attached a sprocket wheel $v^2$, carrying a chain, $w^1$, which passes over and around sprocket wheel $v^4$. Both the sprocket wheel $v^4$ and target $a^5$, are rigidly attached to shaft $c^{13}$ which passes loosely through the back framework $d$. To shaft $c^1$, is rigidly attached sprocket wheel $v^5$, carrying chain $w^3$ which passes over sprocket wheel $v^3$. Shaft $c^{12}$ passes loosely through framework $d$, and has rigidly attached to one end target $a^6$, and upon the other end sprocket wheel $v^3$. Shaft $c$, has a sprocket wheel $v^6$, rigidly attached thereto, over which runs a chain, $w^2$. This chain $w^2$, passes around sprocket wheel $v^1$, which is rigidly attached to shaft $c^{11}$. Shaft $c^{11}$ passes loosely through framework $d$, and target $a^7$, is rigidly attached to the outer end of shaft $c^{11}$. The sprocket wheels $v$, $v^1$, $v^2$, $v^3$, should be about of the same size as gear wheels $f$, $f^1$, $f^2$, $f^3$. Shaft $c^{11}$ passes through chain $w$, shaft $c^2$ passes through chain $w^2$, shaft $c^{12}$ passes through chains $w$, $w^1$, $w^2$, and shaft $c^{13}$ passes through chain $w$, the size of the sprocket wheels being larger than the shafts no interference is encountered. It will be observed should target $a$, be revolved by the depression of a key as shown in Figs. 4, 18, that target $a^4$, will be operated and when the change key $ch$, has been operated upon as hereinbefore explained, that the rack $g^7$, will return target $a^4$, to zero at the same time that target $a$, is returned to its normal position by the reversal of the sprocket chain $w$.

Figures 14, 15, 16, 17:
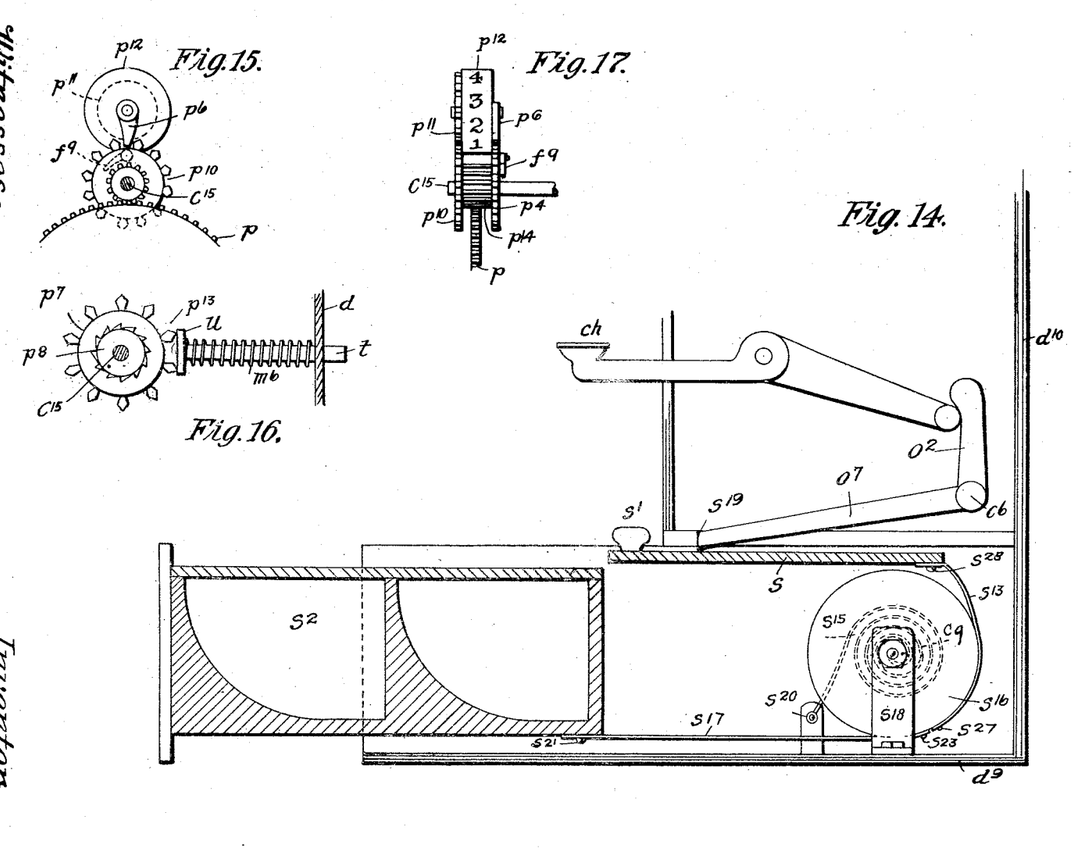
Fig. 14 is an end view of the cash drawer when open.
Figs. 15, 16 and 17 an improved form of registering mechanism.

In Figs. 15, 16, 17 is shown the improvement in the registering device heretofore mentioned in this specification. Auxiliary gear wheel $p^{10}$ carries a pinion $p^{14}$, which is rigidly attached thereto. Auxiliary gear wheel $p^4$, rides loosely upon shaft $c^{15}$, and carries a pawl, $f^9$. Auxiliary gear wheel $p^7$ of the tens disk has a ratchet wheel $p^8$, rigidly attached thereto. Auxiliary gear wheel $p^7$, rides loosely upon shaft $c^{15}$ and ratchet wheel $p^8$, is engaged by pawl $f^9$ and moved one tooth when wheel $p^4$, is engaged by single tooth $p^6$, which is rigidly attached to registering wheel $p^{12}$, when the parts are in such position as to transfer from one denomination to another. Gear wheel $p$, is in mesh with pinion $p^{14}$, attached to wheel $p^{10}$. Wheel $p^{10}$, is in mesh with gear wheel $p^{11}$, of the numbering wheel $p^{12}$. There is one of these pawls $f^9$, between each auxiliary wheel. When pin $r$, in arm $o^3$, is operated upon by keys 1-9 of the units revolving gear wheel $p$, single tooth $p^6$, of wheel $p^{12}$, will engage with wheel $p^4$, and pawl $f^9$, will engage with ratchet wheel $p^8$, on wheel $p^7$, and wheel $p^7$, will be revolved one tooth. If keys 1-9 of the tens be operated upon engaging arm $o^6$, Fig. 3, with gear wheel $p^1$, pawl $f^9$, will slide over the ratchet teeth of wheel $p^8$, and the unit gear wheel $p$, will remain unchanged. The figure disk of the registering device are brought much closer together by placing the pawls and pinions on the intermediate shaft and it is for that purpose as well as to adapt this type of registering device to my type of machine that I have placed them upon the second instead of the first shaft.

In order that the numbers on wheel $p^{12}$, of the registering device may be kept in line, I have provided a buffer, $u$, which is attached to rod $t$, and which is encircled by a spring $m^6$, Fig. 16. This rod, $t$, passes loosely through framework $d$. Buffer $u$, is made large enough to cover two teeth of wheel $p^7$, and the tension of spring $m^6$, pressing on the two teeth of wheel $p^7$, tends to keep wheel $p^{12}$, properly in line. A similar buffer is employed for each registering wheel.

Figure 12:
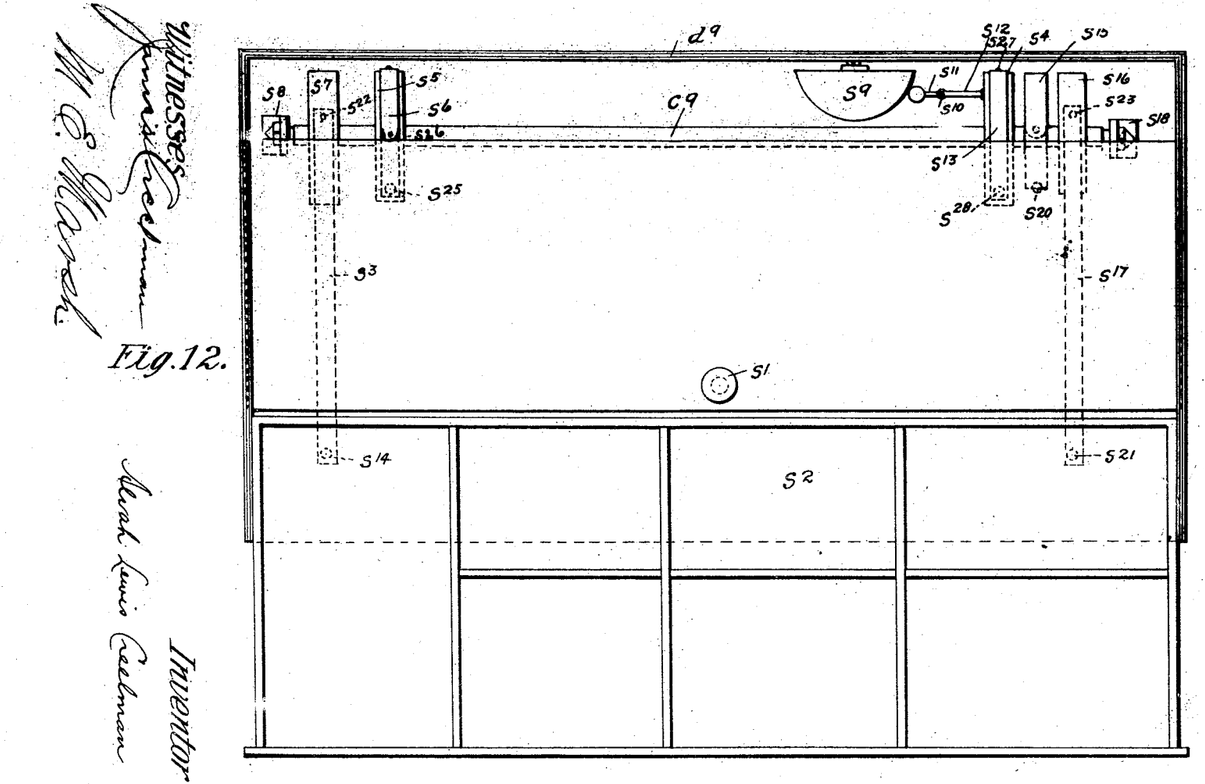
Fig. 12 is a top plan of the cash drawer with the works removed.
Figure 13:
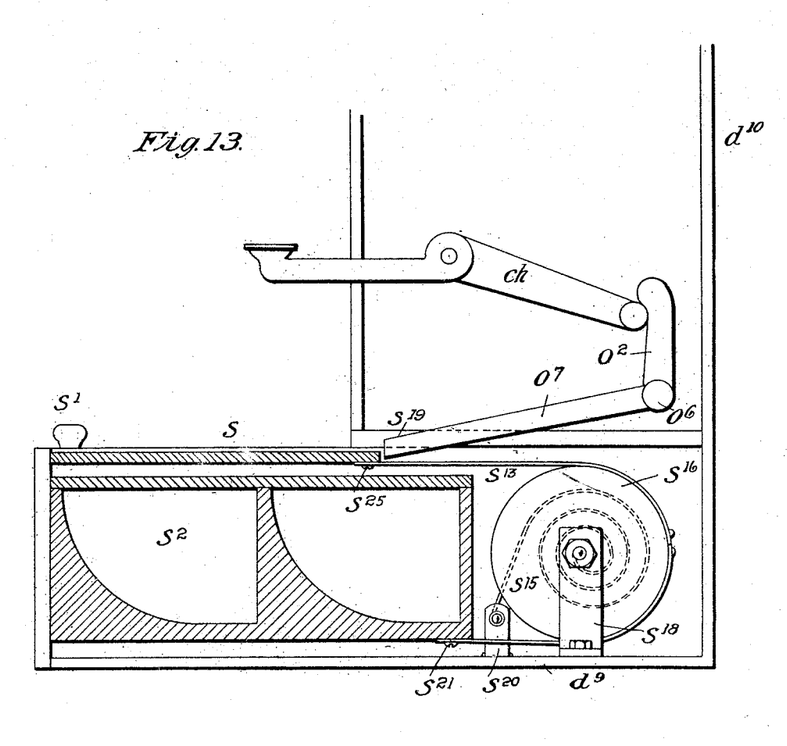
Fig. 13 is a sectional view of the cash drawer closed. It shows the operation of the change key releasing the inwardly sliding top to the cash drawer.

In Figs. 12, 13, 14, is shown the cash drawer, Fig. 12, shows the drawer open with the works of the machine removed for the purpose of illustration. Inwardly sliding top $s$, is shown as being drawn under the works and the cash cells $s^2$, as being manually drawn out. A shaft $c^9$, loosely pivoted to standards attached to frame $d$, at $s^8$, $s^{18}$ Fig. 12, carries wheels $s^7$, $s^5$, $s^4$, $s^{16}$, which are rigidly attached to shaft $c^9$. There is also a spring $s^{15}$, encircling shaft $c^9$, one end of which is attached to shaft $c^9$, and the other end is attached to standard $s^{20}$ of frame $d^9$. Attached to wheel $s^7$ at $s^{22}$ and to wheel $s^{16}$ at $s^{23}$ are two straps, $s^3$, $s^{17}$. The other end of straps $s^3$, $s^{17}$, are attached to cash till $s^2$ at $s^{14}$, $s^{21}$. Wheels $s^5$, $s^4$ also have two straps, $s^6$, $s^{13}$, attached to wheel $s^5$, at $s^{26}$, and on wheel $s^4$, at $s^{27}$. The other end of straps $s^6$, $s^{13}$ are attached to the drawer cover $s$, at $s^{25}$, $s^{28}$. These straps $s^6$, $s^{13}$ are wound upon wheels $s^5$, $s^4$, in the opposite direction to straps $s^3$, $s^{17}$. To be more explicit. one set of straps work on the under side of wheels $s^7$ $s^{16}$, and the other set of straps work over wheels $s^5$, $s^4$, and when knob $s^1$, of drawer lid $s$, is manually pulled forward straps $s^3$, $s^{17}$ will be wound pulling cash till $s^2$, inward and straps $s^6$, $s^{13}$ will be unwound as drawer lid, $s$, is drawn outward. As drawer lid, $s$, is manually withdrawn outward spring $s^{15}$, is wound. Lid $s$, is held closed by arm $o^7$, which is rigidly attached to shaft $c^6$, Figs. 4, 13, 14. This arm $o^7$, intercepts the back end of lid, $s$, at $s^{19}$, when change key $ch$ is operated upon, raising arm $o^7$, clearing lid $s$, at, $s^{19}$, spring $s^{15}$, will draw lid, $s$, backward under the works of the machine partially exposing the cash till $s^2$. If it be desired to open the cash till $s^2$, still further, it may be manually drawn out as shown in Fig. 14. Pulling knob $s^1$, outward will restore cash till $s^2$, to its normal position within the casing and arm $o^7$, will fall of its own weight and engage lid, $s$, at $s^{19}$, keeping the drawer closed until change key $ch$, is again operated upon.

Figure 19:
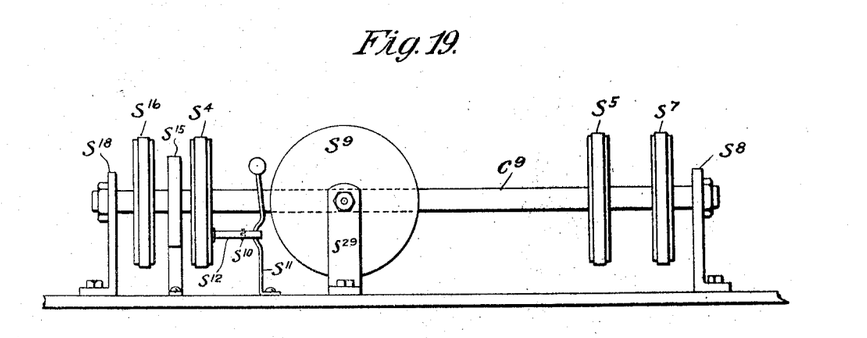
Fig. 19 is a rear elevation showing the mechanism for operating the bell.

In Figs. 12 and 19 is shown the mechanism for operating the bell $s^9$. An arm $s^{12}$, is rigidly attached to wheel $s^4$, and it is provided with a knuckle joint $s^{10}$. Bell clapper $s^{11}$, is placed in the width of the jointed end of arm $s^{12}$, and as lid $s$, is drawn back under pressure of spring $s^{15}$, wheel $s^4$, is revolved carrying arm $s^{12}$, which, coming in contact with clapper $s^{11}$, causes it to vibrate and strike bell $s^9$. As lid $s$, is withdrawn outwardly the knuckle joint $s^{10}$, allows arm $s^{12}$, to pass clapper $s^{11}$, without causing a vibration.

There are some target cash registers upon the market which will show the customer the target without registering the proper amount if the key is not pressed downward its full distance and the key returning to its upward or normal position, if again depressed, would register too much and the cash drawer would be short of the necessary amount of money to tally with the registering device. If it be intended to register say 9 cents upon my machine and key 9, is only depressed so that say 5 cents are shown on the unit target, the key can be further depressed until the 9 cents have been registered and the amount shown upon the target without overcounting on the registering device. It frequently happens that a clerk in a hurry will not depress a key the full stroke and when he discovers his error after the key has returned upward to its normal position he again uses the same key, depressing it to its full length and the amount he first registered would be short in the till. Arm $O^3$, Fig. 9, is rigidly attached to rocker $e$; key 9, operates loosely upon rocker $e$. When key 9, has been depressed engaging pin $r$, with gear wheel $p$, pawl $f^3$, Fig. 10, will prevent wheel $p$, from returning. Key 9 will return to its normal position, but rocker $e$, and pin $r$, will remain as placed by key 9, until change key $ch$, has been depressed operating lever $k$, forcing pin $r$, out of the gear teeth of wheel $p$. If only 5 cents had been registered the clerk could depress key 9 still farther and the total would not be affected. While this feature of my invention is not entirely generic,

I claim as my invention and desire to secure by Letters Patent:—

1. In a registering machine the combination of the machine frame, a main shaft supported upon the machine frame, a rectangular rocker frame, comprising two longitudinal bars, journaled upon the shaft, and located upon the opposite sides thereof, value keys journaled upon the shaft extending across and above the longitudinal rocker frame bar at the front of the machine and having tappets to press downwardly upon said outer longitudinal bar, a gear wheel supported upon the axis of the main shaft, a registering mechanism supported upon the frame and connected with the gear wheel, a rocker arm rigidly attached to the rear end of the rocker frame and a pawl arm operated upon by the rocker arm and supported to oscillate around said gear wheel and engage therewith substantially as described.

2. In a registering machine the combination of the machine frame, a rectangular rocker frame journaled within the main frame, a second rocker frame journaled within the first named rocker frame, value keys having tappets journaled upon the machine frame and arranged in groups, one group to press downwardly upon the front longitudinal bar of the outer rocker frame and the other group to press downwardly upon the front longitudinal bar of the inner rocker frame, indicating and registering mechanisms supported upon the machine frame and arms connected to the rear sides of the rocker frames to operate said mechanisms, substantially as described.

3. In a registering machine the combination of the machine frame, a rectangular rocker frame journaled within the main frame, a second rocker frame journaled within the first named rocker frame, value keys having tappets journaled upon the machine frame and arranged in groups, one group to press downwardly upon the front longitudinal bar of the outer rocker frame and the other group to press downwardly upon the front longitudinal bar of the inner rocker frame, and an outer casing having two sets of graduating openings cut therein through which the keys pass downwardly from top to bottom to admit of the unequal depression of said keys substantially as shown and described.

4. In a registering machine the combination of the machine frame, a rectangular rocker frame journaled within the main frame, a second rocker frame journaled within the first named rocker frame, value keys having tappets journaled upon the machine frame and arranged in groups one group to press downwardly upon the front longitudinal bar of the outer rocker frame and the other group to press downwardly upon the front longitudinal bar of the inner rocker frame, a shaft carrying a rotary target and a gear pinion each rigidly affixed to said target shaft adapted to be connected with each of said rocker frames, rack bars supported in guides to reciprocate vertically upon said frames and engage with the gear pinions and links connecting said rack bars and said rocker frames and adapted to make a whole revolution of said targets substantially as described.

5. In a registering machine the combination with the main frame, of a rocker frame pivoted thereon a shaft supported upon the frame and value keys journaled thereon, and adapted to press upon said rocker frame, a shaft carrying a disk target, a ratchet wheel and a gear pinion on the target shaft, a rack bar connecting the rocker frame and gear pinion, a retracting spring connecting the main frame and rocker frame, a pawl pivoted to the main frame to engage the ratchet wheel of the target shaft, a pawl shaft and coiled spring thereon to connect with the pawl, a change key and a rod and lever connecting said pawl shaft with the change key for releasing the target shaft, substantially as described.

6. In a registering machne the combination of the main frame, of two sets of rocker frames each set comprising two rectangular frames pivotally supported one within the other, main gear wheels supported upon the frame between the two sets of rocking frames a registering device having gear wheels engaging with the main gear wheels between the two sets of rocker frames, value keys arranged in groups one group to press downwardly upon the front longitudinal bar of the outer rocker frame and the other group to press downwardly upon the front longitudinal bar of the inner rocker frame and arms and pawls to connect the rocker frames with the main gear wheels as shown and described.

7. In a registering machine the combination of a rocker frame, a gear wheel and a registering device operated thereby, value keys, for operating and locking the rocker frame to the gear wheel a buffer post and a regulating screw inserted therein, a retraction spring connecting the rocker frame and main frame, and a change key for releasing said rocker frame from the gear wheel of said registering device subtantially as described.

8. In a registering machine the combination of the frame, a shaft, a gear wheel on said shaft and a registering device operated thereby, a rocker frame journaled upon the shaft, value keys journaled upon the shaft to operate the rocker frame, an arm attached rigidly to said rocker frame having a slot in the end thereof, a second arm journaled upon the shaft, a third arm pivotally attached to the second arm having a pin secured thereto to pass through the slot in the rocker arm and a second pin to engage the teeth of the gear wheel, substantially as described.

9. In a registering machine the combination of the main frame, a rocker frame and value keys journaled thereon, a gear wheel and registering device operated thereby, a change key, a rocker shaft having two arms one of which is engaged by the change key, a link connected to the other one of said arms, a rocking lever connected to the link, an oscillating pawl arm and pin to engage the gear wheel and operated upon by the rocking lever to disengage the pin from the gear wheel substantially as described.

10. In a registering machine the combination of a value key, a change key, a rocker, an arm attached to said rocker and having an elliptical opening in the end thereof, a shaft, a gear wheel and a second arm riding loosely upon said shaft, a third arm loosely attached to said second arm and carrying two pins, one of said pins encircled by said elliptical opening, the other pin capable of engaging the teeth of said gear wheel, a retraction spring attached to said rocker a rest, or fixed stop projecting from the frame to engage the rear end of the second arm when said change key is operated disengaging said second pin from the teeth of said gear wheel, when said second arm is drawn downward under the influence of said retraction spring as shown and described.

11. In a registering machine the combination of the main frame, of a main shaft, a plurality of main gear wheels thereon, the value keys and mechanism connected therewith for rotating the gear wheels, a registering device comprising a shaft and a plurality of registering wheels supported thereon, each registering wheel having a gear wheel upon one side and a single tooth upon the other side thereof, an intermediate gear shaft placed between the main gear wheel and the registering wheel, a gear wheel with a pinion rigidly attached thereto, a second gear wheel with a pawl attached thereto, and a ratchet wheel all riding loosely upon said intermediate shaft, said gear wheel capable of meshing with the gear wheel of the registering wheel and the pinion of said gear wheel capable of meshing with the main or driving gear wheel, said second gear wheel capable of engaging with the single tooth on the registering wheel and the pawl carried by said second gear wheel capable of engaging said ratchet wheel for operating a registering wheel of a higher denomination substantially as described.

12. In a registering machine in combination with the intermediate gear shaft, a registering device, a gear wheel, a buffer, a rod attached thereto and extending through the frame work, said rod encircled by an extension spring, said buffer placed in the path of two teeth of said gear wheel on said intermediate gear shaft whereby when said gear wheel is revolved said buffer under the influence of its spring will press against the outer ends of said two gear teeth and keep the ends of said two teeth even with the face of said buffer as shown and described.

13. In a registering machine the combination of the machine frame, a rectangular rocker frame journaled within the main frame, a second rocker frame journaled within the first named rocker frame, value keys having tappets journaled upon the machine frame and arranged in groups, one group to press downwardly upon the front longitudinal bar of the outer rocker frame and the other group to press downwardly upon the front longitudinal bar of the inner rocker frame, revolving shafts and targets rigidly attached thereto actuated by each group of keys, a sprocket wheel rigidly attached to the first target shaft, a rear target shaft and sprocket wheel and a chain connecting the sprocket wheel of the first target shaft to the sprocket wheel of the said rear target shaft substantially as described.

14. In a registering machine in combination with the cash drawer thereof, a shaft, a spring encircling said shaft, a first and a second disk, or wheel rigidly attached to said shaft, a first and a second strap attached to said first and second disk, an inwardly sliding lid, one end of said first and second straps rigidly attached to said lid, a second shaft an arm attached thereto, said arm engaging with said lid, a change key, whereby when said change key is operated said arm attached to said second shaft will be raised releasing said lid, said spring revolving said first shaft, drawing said lid inwardly, partially uncovering said cash drawer as shown and described.

15. In a registering machine in combination with the cash drawer thereof, a shaft, a spring encircling said shaft, a first and a second disk or wheel rigidly attached to said shaft, a first and a second strap attached to said first and second disk, a cash drawer, one end of said first and second straps rigidly attached to said cash drawer, and the other end thereof attached to the disk, an inwardly moving lid to said cash drawer, a change key controlling an arm restraining said lid, said change key on being depressed, releasing said inwardly moving lid, to partially uncover said cash drawer, thus exposing only a portion of the cells and when drawn out manually and completely exposing all of said cells, and also winding the spring, encircling said shaft substantially as shown and described.

16. In a registering machine in combination with the cash drawer thereof, a shaft, a spring encircling said shaft, a first, a second, a third and fourth disk rigidly attached to said shaft, a first, second, third and fourth strap attached to said disks, two of said straps passing over the top of two of said disks, and two of said straps passing under two of said disks, two of said straps being attached to the cash drawer and two of said straps being attached to the lid of said cash drawer, whereby when said lid is manually outwardly withdrawn the said cash draw will be drawn inwardly and the spring on said shaft will be wound as shown and described.

17. In a registering machine in combination with the cash drawer thereof, a bell, a clapper, a shaft, a disk rigidly attached to said shaft, an arm rigidly attached to said disk, said arm provided with a knuckle joint, said clapper placed in the path of said knuckle joint, a spring encircling said shaft, an inwardly moving lid to said cash drawer, one end of said strap being attached to said lid and the other end of said strap being attached to said disk, a change key controlling a lever for releasing said lid, whereby said lid is inwardly drawn, said spring revolving said shaft carrying said disk and said knuckle jointed arm which, coming in contact with said clapper of said bell causes it to be sounded, upon the depression of said change key as shown and described.

ALVAH LEWIS CREELMAN.

Witnesses:
MARGARET JACKSON,
M. E. MARSH.